United States Patent [19]

Utoh et al.

[11] Patent Number: 4,718,742
[45] Date of Patent: Jan. 12, 1988

[54] BATTERY FITTING DEVICE USABLE FOR ELECTRONIC APPLIANCE

[75] Inventors: Yoshihiro Utoh; Shinichi Shibata, both of Hino; Hiroyuki Kitahara, Kanagawa, all of Japan

[73] Assignees: Kabushiki Kaisha Toshiba, Kawasaki; Tokai Communication Industry Co., Ltd., Tokyo, both of Japan

[21] Appl. No.: 780,796

[22] Filed: Sep. 27, 1985

[30] Foreign Application Priority Data

Sep. 29, 1984 [JP] Japan ................ 59-204230

[51] Int. Cl.[4] ............... H01R 33/945; H01R 17/00; H01M 2/10
[52] U.S. Cl. ..................... 439/627; 429/96; 429/100
[58] Field of Search ............ 339/147 R, 152, 252 R, 339/176 P; 429/96, 97, 98, 99, 100; 446/439; 368/88, 204, 279; 354/288 E; 381/69.2

[56] References Cited

U.S. PATENT DOCUMENTS

| | | | |
|---|---|---|---|
| 2,478,887 | 8/1949 | Nelson | 429/100 |
| 2,731,586 | 1/1956 | Born | 339/152 |
| 2,734,177 | 2/1956 | Gilbert | 339/221 R |
| 3,138,491 | 6/1964 | Rubio | 429/97 |
| 3,537,909 | 11/1970 | Horton | 429/98 |
| 4,153,758 | 5/1979 | Cerny | 429/98 |
| 4,411,486 | 10/1983 | Behrendt | 339/147 R |
| 4,584,250 | 4/1986 | Hooke et al. | 429/97 |

Primary Examiner—Gil Weidenfeld
Assistant Examiner—Gary F. Paumen
Attorney, Agent, or Firm—Finnegan, Henderson, Farabow, Garrett & Dunner

[57] ABSTRACT

A battery fitting device for fitting a button-shaped battery into an electronic appliance such as telephone or the like. The device includes a battery holder adapted to accommodate a button-shaped battery, which assembly is then inserted into a holder accommodating cavity provided in a case for the appliance. The battery is firmly clamped between contact leaf springs disposed in the holder accommodating cavity by the resilient forces of the contact leaf springs.

12 Claims, 11 Drawing Figures

BATTERY FITTING DEVICE USABLE FOR ELECTRONIC APPLIANCE

BACKGROUND OF THE INVENTION

1. FIELD OF THE INVENTION

The present invention relates to a battery fitting device for use with electronic appliances and more particularly to a device for fitting a button-shaped battery to an electronic appliance such as a telephone or the like.

2. DESCRIPTION OF THE PRIOR ART

A conventional electronic appliance with a button-shaped battery incorporated therein is generally constructed such that a recess having the square cross-sectional configuration adapted to be fitted with a cover is formed on the side wall of the appliance. Moreover, a circular cavity or cavities for accommodating a button-shaped battery or batteries therein are formed on the bottom of the recess. One end part of a contact spring serving as a negative electrode and one end part of a contact spring serving as a positive electrode are exposed to the inner space in the circular cavity. Specifically, the end part of the negative electrode contact spring extends along the bottom surface of the circular cavity until it reaches the center of the cavity and it is then bent upwardly away from the bottom surface of the cavity. On the other hand, the end part of the positive electrode contact spring extends along the side wall of the circular cavity until its extreme end reaches the position located approximately at the middle of the height of the side wall. Both the other end parts of the negative and positive electrode contact springs are electrically connected to electronic components in the case by lead wires or the like.

After the button-shaped battery is accommodated in the circular cavity, the circular cavity is fitted with the cover and the assembly is then fitted into the square recess. Thus, fitting of the button-shaped battery to the electronic appliance is completed. The button-shaped battery firmly set in the electronic appliance in this way is used in such a manner that the seal cover (serving as a negative electrode) comes in contact with the foremost end of the negative electrode contact spring and the peripheral wall (serving as plus electrode) comes in contact with the foremost end of the positive electrode spring.

In the case of the conventional battery fitting device it is necessary to immovably hold the cover on the case of the electronic appliance. To eliminate the above-mentioned necessity, it is known to provide a projection at the one end of the cover and an additional recess formed on the side wall of the square recess, whereby fastening of the cover to the case of the electronic appliance is achieved by fitting the projection at the one end of the cover into the additional recess and then attaching the other end of the cover to the bottom surface of the square recess by means of a plurality of set screws.

However, it has been found with respect to the battery fitting device with the above-mentioned cover fastening system employed therefor that the set screws become loosened by vibration or the like, causing the cover to float up above the case, resulting in incomplete electric contact between the battery and the contact spring. Another drawback to the battery fitting device as constructed in the above-described manner is that the set screws must be removed and then replaced whenever the battery is replaced which requires a complicated handling operation. Moreover, removing the used battery is difficult due to the fact that it is fitted into the bottom of the circular cavity.

SUMMARY OF THE INVENTION

Thus, the present invention has been made with the foregoing background in mind and its object resides in providing a battery fitting device for use with an electronic appliance which assures that proper electrical contact between the button-shaped battery and the contact leaf spring is reliably maintained.

Another object of the present invention is to provide a battery fitting device for use with an electronic appliance which assures easy replacement of the battery.

To accomplish the above objects a battery fitting device is provided according to the present invention comprising a holder molded in the form of a plate-shaped member, the holder being formed with a bore in which the button-shaped battery is accommodated, and a casing in the electronic appliance including a holder accommodating cavity in which the holder with the button-shaped battery fitted thereto is accommodated, the casing being provided with contact leaf springs which are disposed in parallel with opposing walls of the holder accommodating cavity.

When the device of the invention is employed for an electronic appliance, the battery accommodated in the cavity of the battery case is firmly clamped between contact leaf springs disposed in parallel with the opposing walls of the cavity while proper electrical contact is maintained between the battery and the contact leaf springs. Further, since the battery is inserted into and removed from the cavity with the aid of a holder, fitting and removing the battery are accomplished with relative ease. Further, since the battery is removed from the bore in the holder by pushing it out of the bore, removing of the battery from the holder is easily achieved.

Other objects, features and advantages of the present invention will become readily apparent from reading of the following description which has been prepared in conjunction with the accompanying drawings.

DESCRIPTION OF THE PREFERRED EMBODIMENT

Figure 1:
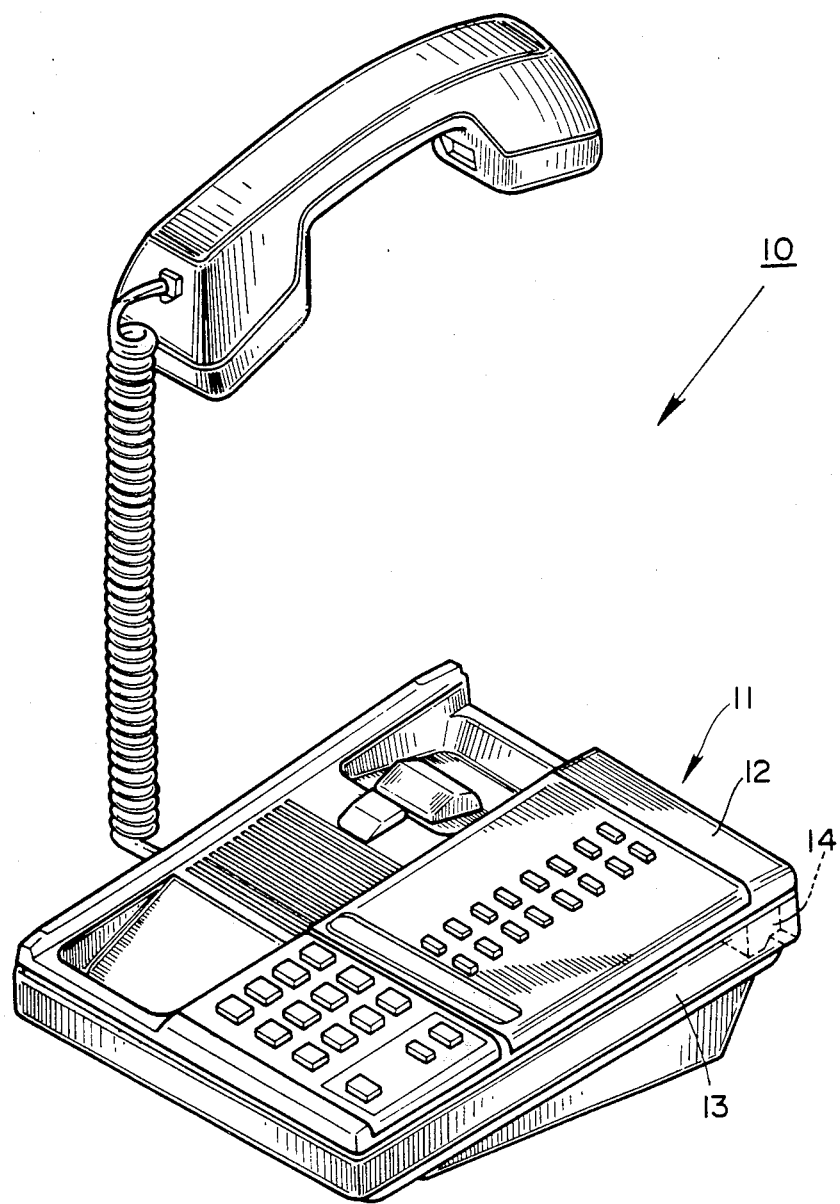
FIG. 1 is a perspective view of a telephone in which the device of the invention is incorporated.

The present invention will be described in more detail with reference to the accompanying drawings which illustrate a preferred embodiment of the invention.

As illustrated, a telephone 10 includes a casing 11, upper cover 12 and lower cover 13 and a recess 14 formed in the area located over the rear wall of the lower cover 13. As will be apparent from FIG. 2, a button-shaped battery 1 and a rectangular-shaped box battery 2 are accommodated in the recess 14. A cover 15 is then fitted over the recess 14.

A battery fitting device for the button-shaped battery 1 comprises a holder 16 and a holder retaining portion 17 disposed in the recess 14. The button-shaped battery 1 is inserted into the holder 16 in the direction identified by arrow a and the holder 16 with the button-shaped battery 1 is then inserted into the holder retaining portion 17 in the direction identified by arrow b. Thus, the button-shaped battery 1 is held in the holder retaining portion 17.

The following is a description of the holder 16 and the holder retaining portion 17.

Figure 2:
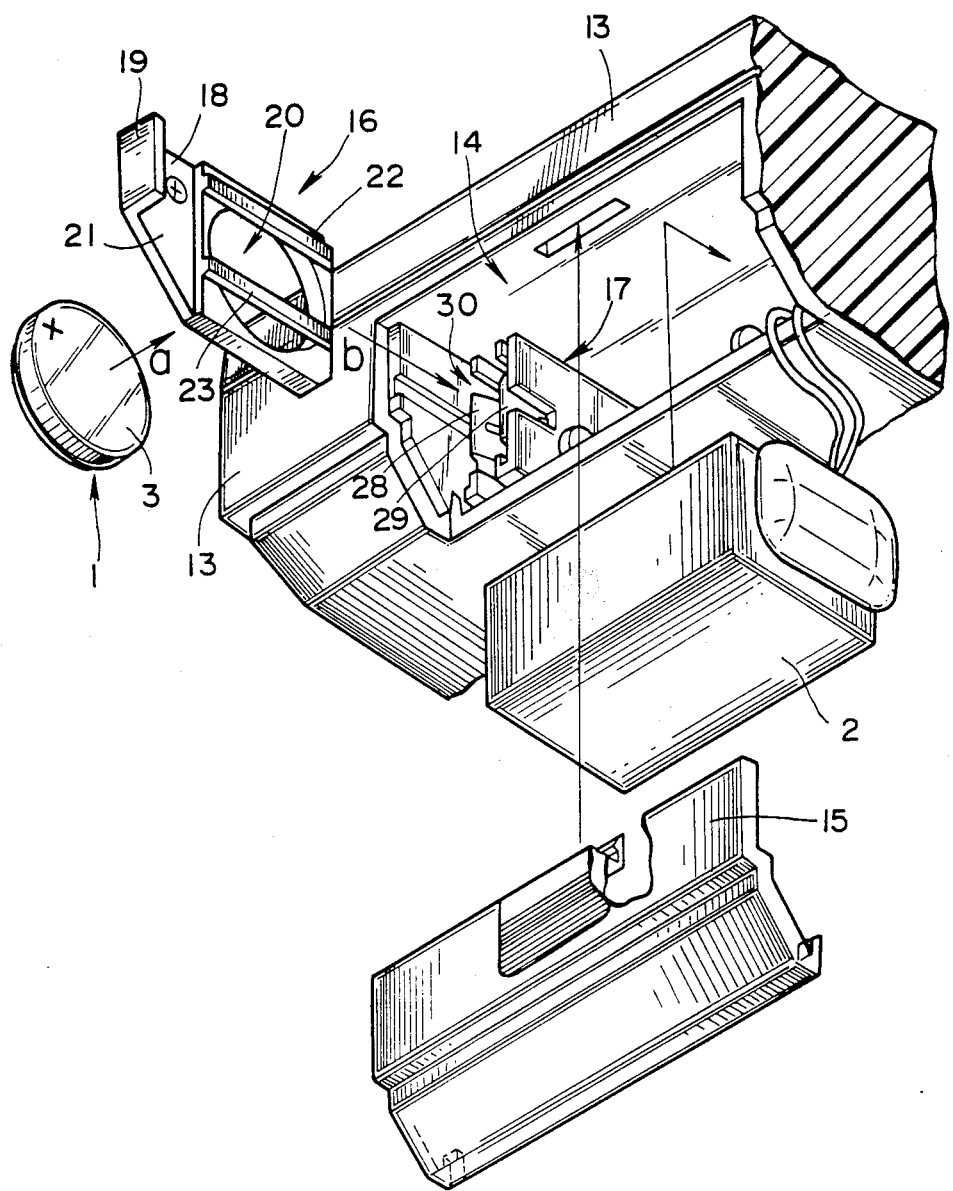
FIG. 2 is a perspective view particularly illustrating how a button-shaped battery is fitted to a holder which is then inserted in a holder accommodating cavity in a casing of an electrical appliance.
Figure 3:
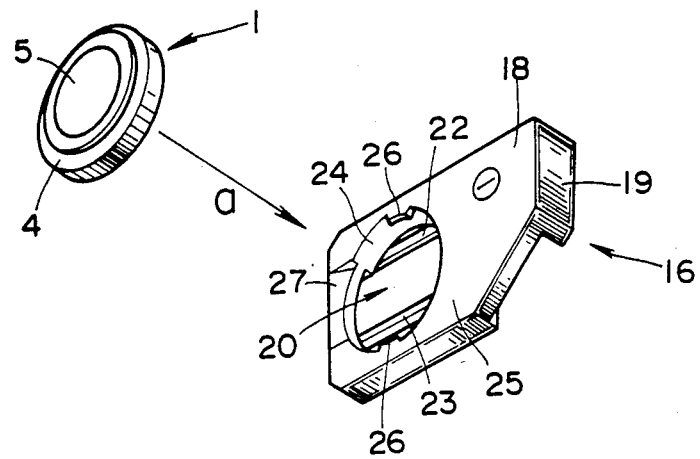
FIG. 3 is a perspective view particularly illustrating how the button-shaped battery is accommodated in the battery holder.

The holder 16 is molded in the form of a plate-shaped member 18, as shown in FIGS. 2 and 3. The plate-shaped member 18 is formed with a grasping portion 19 at the fore end thereof as seen in FIG. 2. This grasping portion is adapted to be used when the holder 16 is inserted into the holder retaining portion 17 and when the holder is removed from the holder retaining portion. As is apparent from the drawings, the plate-shaped member 18 has an inclined cutout at the lower corner of its front part so as to inhibit any interference of the holder 16 with the lower cover 13 when the cover 15 is fitted to the lower cover 13. Further, the plate-shaped member 18 is formed with a bore 20 at the central part thereof into which the button-shaped battery 1 is fitted. Two cross bars 22 and 23 are provided on one surface of the plate-shaped member 18 (the surface on which a plus mark is impressed) to extend across the bore 20. As is apparent from FIG. 2, the cross bars 22 and 23 are located in an upwardly offset position. As shown in FIG. 3, an opposing pair of resilient pawls 26 are projected inwardly of the inner wall 24 of the bore 20 on the other surface side 25 of the plate-shaped member 18. A part of the wall area located between the opposing pair of pawls 26 is cut off to form an inclined surface 27 which extends between the one end of the plate-shaped member 18 and the inner periphery of the bore 20.

Fitting the button-shaped battery 1 to the holder is carried out by inserting the button-shaped battery 1 into the bore 20 while a positive mark impressed on the one end face 3 of the button-shaped battery 1 is located in alignment with the plus mark impressed on the one surface 21 of the holder 16, as shown in FIG. 2. On completion of fitting operation the end surface 3 of the button-shaped battery 1 comes in contact with the cross bars 22 and 23 and the stepped portion 4 of the button-shaped battery is retained by the locking engagement of the pawls 26 whereby the battery 1 is firmly held within the bore 20.

FIGS. 4 to 8 illustrate how the holder retaining portion 17 is constructed.

Figure 4:
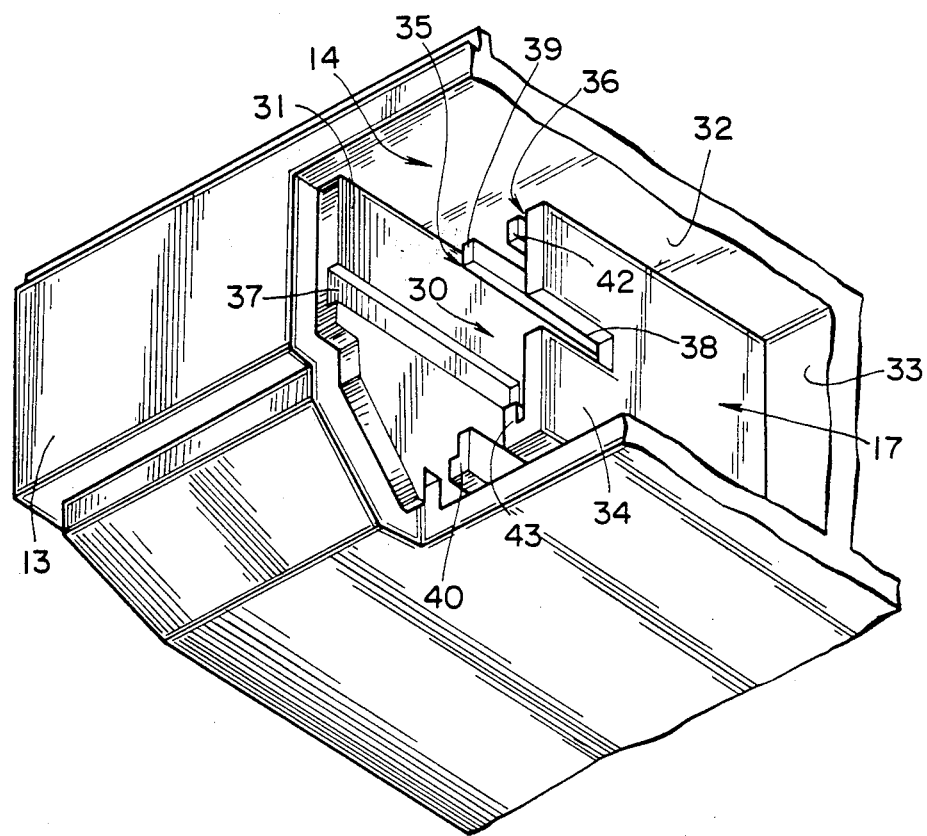
FIG. 4 is a perspective view of a holder retaining portion in the appliance case, shown in the partially exploded state.
Figure 6:
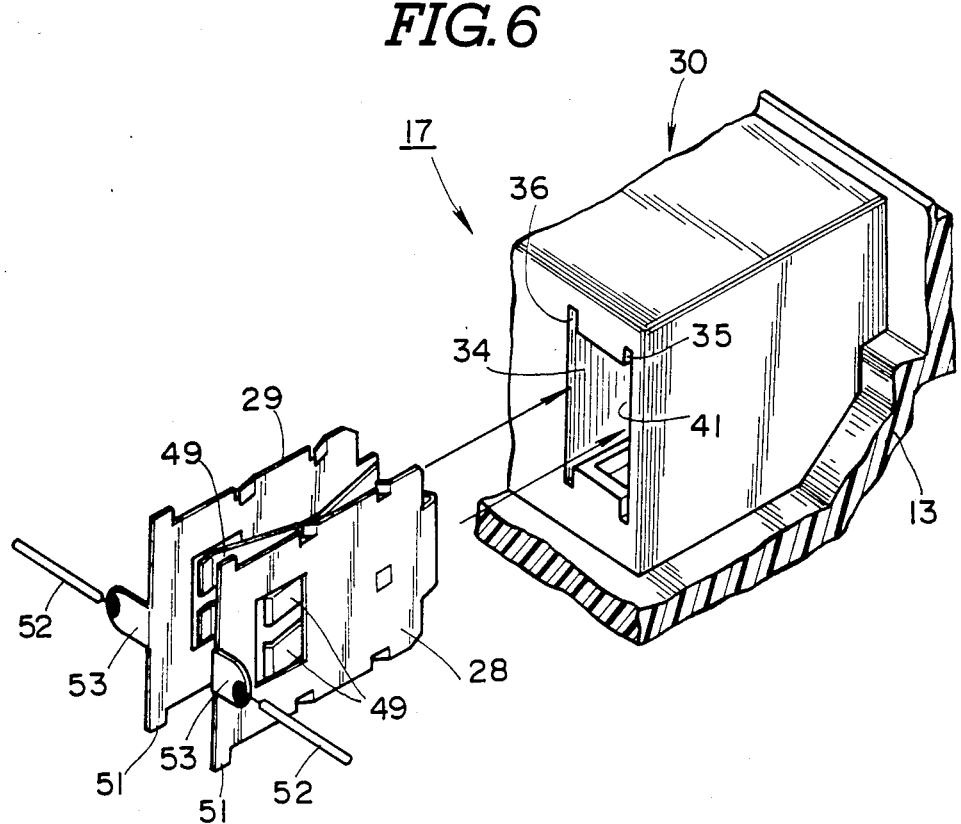
FIG. 6 is a perspective view of the holder retaining portion as seen from the back side, particularly illustrating how two contact leaf springs are inserted into the cavity of the holder retaining portion.
Figure 7:
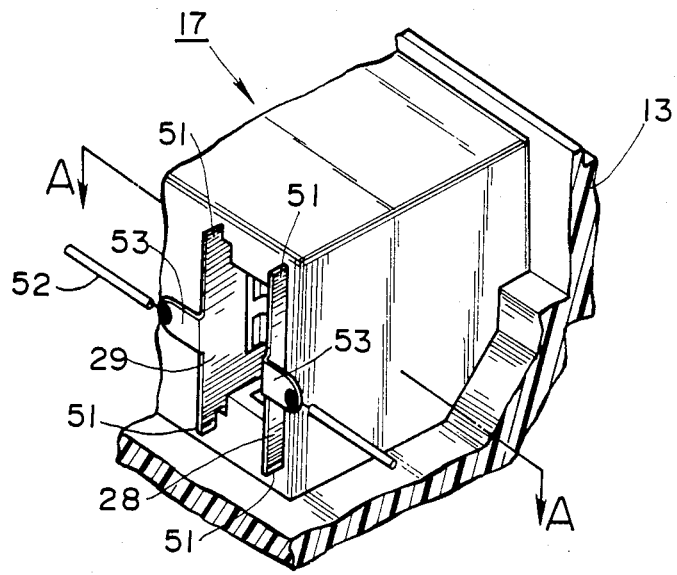
FIG. 7 is a perspective view of the holder retaining portion with the contact leaf springs accommodated therein, seen from the back side.
Figure 8A:
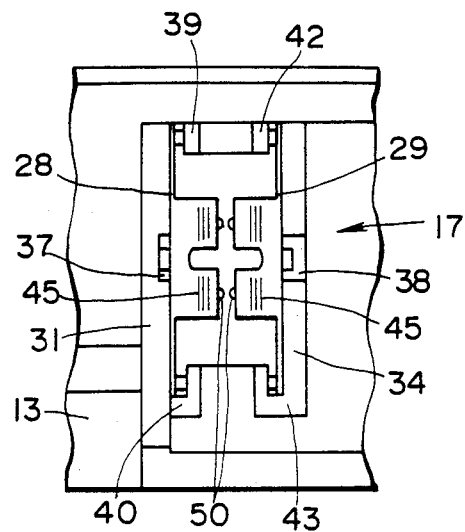
FIG. 8(a) is a fragmental front view of the holder retaining portion.
Figure 8B:
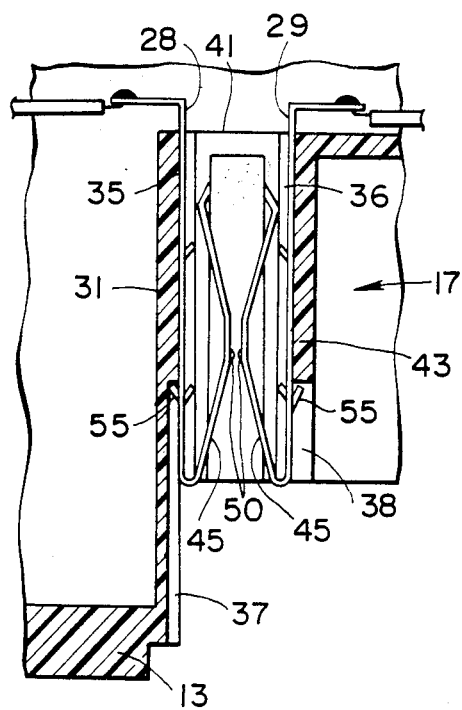
FIG. 8(b) is a fragmental sectional view of the holder retaining portion taken along line A—A in FIG. 7.

Specifically, the holder retaining portion 17 comprises two contact leaf springs 28 and 29 having the same configuration and a holder accommodating cavity 30 adapted to hold the contact leaf spings 28 and 29 and accommodate the holder 16. As illustrated in FIGS. 4 and 6, the holder accommodating cavity 30 is provided with two slits 35 and 36 which are formed by the combination of side wall 31, upper wall 32, rearmost wall 33 and partition 34 whereby the contact leaf springs 28 and 29 are inserted into the slits 35 and 36. An opening 41 is provided opposite the rearmost wall 33. Further, the holder accommodating cavity 30 is provided with grooves 37 and 38 on the side wall 31 and the partition 34.

The slit 35 is formed by the combination of side wall 31, rod-shaped guide portion 39 located opposite to the side wall 31 and another guide portion 40 having the L-shaped cross-sectional configuration so that the contact leaf spring 28 is inserted through the slit 35 from the opening 41. On the other hand, the slit 36 is formed by the combination of partition 34, rod-shaped guide portion 42 located opposite the partition 34 and another guide portion 43 having the L-shaped cross-sectional configuration located at the lower end of the partition 34. The contact leaf spring 29 is inserted through the slit 36 from the opening 41.

Figure 5:
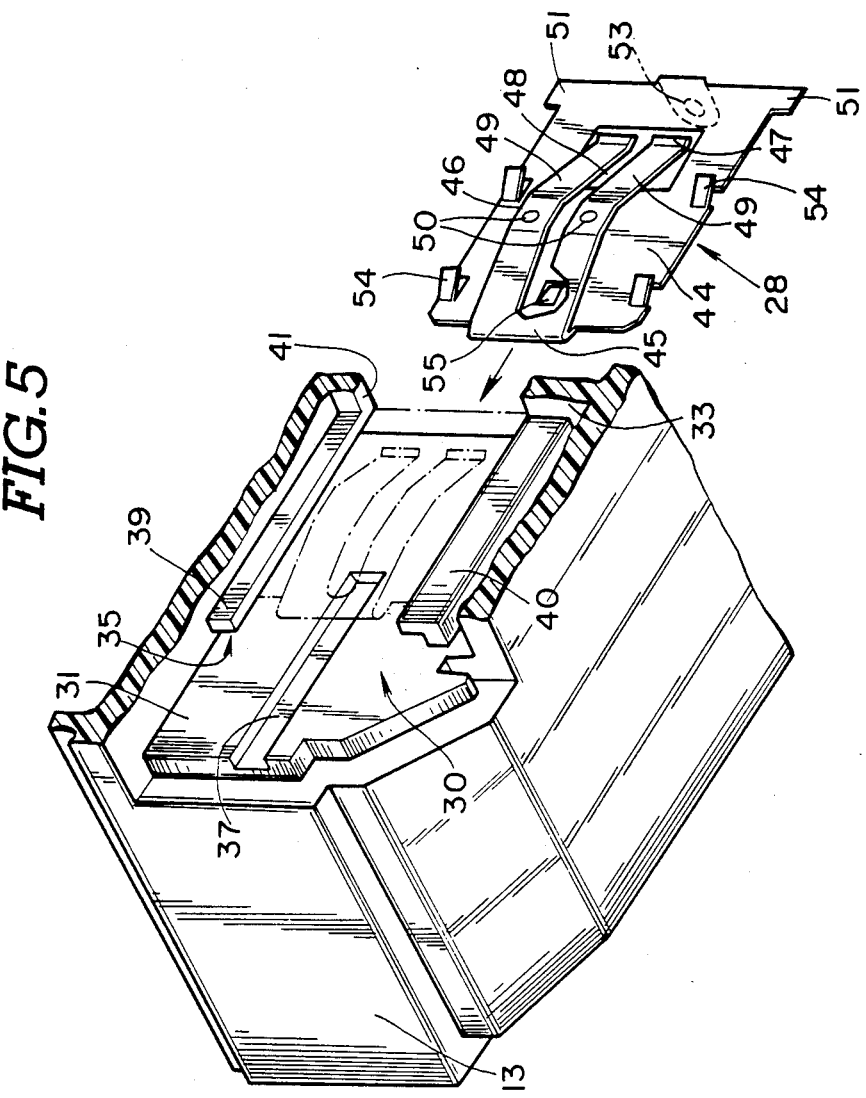
FIG. 5 is a partially exploded perspective view of the holder retaining portion particularly illustrating how a contact leaf spring is inserted thereinto.

As shown in FIG. 5, the contact leaf spring 28 comprises a flat plane portion 44 and a tongue portion 45 which is an extension of the flat plane portion 44 bent backwardly onto itself at the foremost end of the flat plane portion. As is apparent from the drawing, the tongue portion 45 is slightly bent in such a manner as to form a flat middle part 46 that is parted away from the surface of the flat plane portion 44. Moreover, the free end part 47 of the tongue portion 45 is slightly bent upwardly away from the surface of the flat plane portion 44. The tongue portion 45 is formed with a slit 48 so that it is divided into two strips 49. Each of the strips 49 is provided with a semispherical contact 50 which projects outwardly from the flat middle part 46 of the tongue portion 45.

On the other hand, the flat plane portion 44 includes a stopper portion 51 having a width that is larger than that of the flat plane portion 44. The flat plane portion 44 also includes a terminal portion 53 at which a lead wire 52 is electrically connected to the flat plane portion 44 by soldering at the rear end of the flat plane portion 44. Further, the flat plane portion 44 is formed with four projections 54 projecting upwardly on the same side as the tongue portion 45 at both the upper and lower ends of the plane portion. Another projection 55 arranged at the upper end of the plane portion between the strips 49 projects downwardly in a direction opposite to the projections 54.

It should be noted that the contact leaf spring 29 has the same configuration, parts and reference numerals as the contact leaf spring 28.

As is apparent from FIG. 6, the contact leaf springs 28 and 29 are inserted through the slits 35 and 36 in such a manner that their tongue portions 45 are located opposite to one another. On completion of insertion of the contact leaf spring 28 the projections 54 come in thrust contact with the guide portions 39 and 40, resulting in the contact leaf spring 28 being located adjacent the side wall 31 under the influence of thrust force without any rattling movement occurring. When the contact leaf spring 28 is inserted through the slit 35 until the stopper portion 51 abuts against the back side of the rearmost wall 33, the projection 55 enters the groove 37 on the side wall 31 whereby the contact leaf spring 28 is firmly held within the area defined by the slit 35 (see FIG. 8(b)). The contact leaf spring 29 operates in the same manner. The contact leaf spring 29 is located adjacent to the partition 34 under the influence of thrust force without any rattling movement occurring and the projection 55 enters the groove 38 when the contact leaf spring 29 is fully inserted through the slit 36. Thus, the contact leaf spring is firmly held within the area defined by the slit 36.

Next, the operation of the device constructed according to an embodiment of the invention will be described below.

As described above, the button-shaped battery 1 is fitted to the bore 20 of the holder 16 in the direction identified by arrow a in FIG. 2. Thereafter, the holder 16 with the button-shaped battery 1 is inserted into the space defined between the contact leaf springs 28 and 29 in the direction identified by arrow b, whereby it is held in the holder retaining portion 17. Thus, the negative electrode surface 5 of the button-shaped battery 1 comes in contact with the contacts 50 on the contact leaf spring 28 and the positive electrode surface 3 comes in contact with the contacts 50 on the contact leaf spring 29, whereby electrical connection is established with the electronic circuits incorporated in the telephone.

Figure 9A:
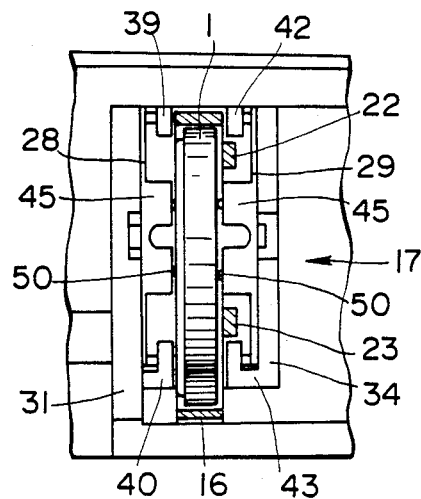
FIG. 9(a) is a fragmental front view of the holder retaining portion with the battery holder accommodated therein.
Figure 9B:
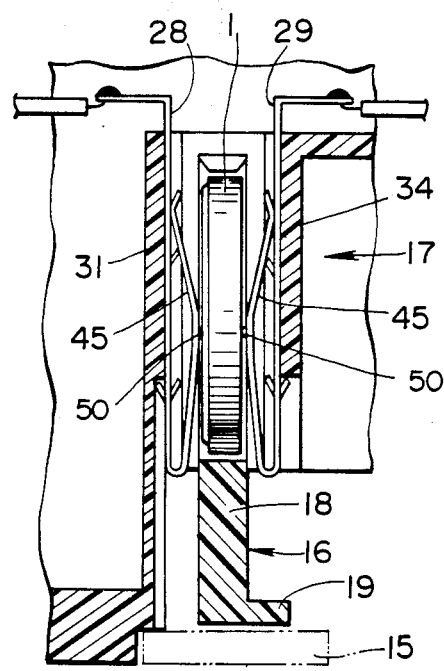
FIG. 9(b) is a fragmental sectional view of the holder retaining portion with the battery holder accommodated therein, taken along line A—A in FIG. 7.

When the holder 16 is inserted into the holder retaining portion 17, the tongue portions 45 of the contact leaf springs 28 and 29 are deformed by the button-shaped battery 1 so that they are parted away from one another, as illustrated in FIG. 9(b). At this moment the free end part 47 of the tongue portion 45 comes into contact with the side wall 31 or the partition 34. This contact results in both ends of the tongue portion 45 being supported by the side wall 31 or the partition 34. As a result, the button-shaped battery 1 is tightly clamped between the contact leaf springs 28 and 29 under a high intensity resilient force.

Since each of the contact leaf springs 28 and 29 includes two strips 49, each of which is provided with a contact 50, it is assured that reliable electrical connection is established between the contact leaf springs 28 and 29 and the button-shaped battery 1. Further, since the button-shaped battery 1 is inserted into or removed from the holder retaining portion 17 while it is tightly held by the thrust force of the four contacts 50, the metallic surfaces of the button-shaped battery 1 and the contacts 50 are always in the rubbed state. Thus, the surfaces are brought in contact with one another when each surface has a fresh metallic surface having no oxidized film or foreign material, resulting in a high reliability of the electrical connection.

In the illustrated embodiment the holder 16 and the holder retaining portion 17 are not provided with any specific means for preventing the holder 16 from being disconnected from the holder retaining portion 17 (for instance, arrangement or provision of a projected part and a recessed part which are fitted to one another). However, the button-shaped battery 1 is firmly clamped between the tongue portion 45 by a resilient force which provides a means for preventing the holder 16 from being disconnected from the holder retaining portion 17. Moreover, as will be apparent from FIG. 9(b), the grasping portion 19 of the holder 16 abuts the cover 15 when the holder 16 is displaced in the direction of removal while the cover 15 is fitted to the lower cover 13. This structure also prevents removal of the holder 16.

As will be readily apparent from the above description, the cross bars 22 and 23 prevent the holder 16 from being inserted incorrectly. As shown in FIG. 9(a), during insertion of the holder 16 into the holder retaining portion 17, movement of the cross bars 22 and 23 is guided by the guide portions 42 and 43 without deviation in the vertical direction. In this way, the holder 16 is firmly held in the holder retaining portion 17 at a predetermined position. However, when the holder 16 is inserted upside-down, the cross bar 22 abuts against the guide portion 40, thereby preventing further insertion of the holder 16. As a result, it is assured that the button-shaped battery 1 is fitted into the holder retaining portion 17 of the casing 11 without the incorrect selection of polarity.

While the present invention has been described above only with respect to a single preferred embodiment thereof, it should of course be understood that it should not be limited to this but various changes or modifications may be made in any acceptable manner without departure from the spirit and scope of the invention as defined by the appended claims.

What is claimed is:

1. A device for fitting a button-shaped battery in a casing of an electric appliance such as a telephone or the like, comprising:
    a battery holder including a plate-shaped member having a bore for receiving the button-shaped battery, said battery holder being detachable from the casing and including guide members arranged across the bore for receivably supporting the battery on one side of the plate-shaped member;
    a holder retaining means disposed in the casing, said holder retaining means including
    a cavity for receiving said holder, said cavity including an opening and four longitudinally extending walls, and
    contact leaf springs arranged on two opposing walls of said four longitudinally extending walls of the cavity; and
    guide means extending in opposing parallel relation to the two opposing longitudinally extending walls of the cavity for guidingly receiving the battery holder;
    wherein the guided members on the battery holder are parallel to one another in a longitudinal direction corresponding to the longitudinally extending guide means and vertically offset from a center of the bore at different distances from the center of the bore, and wherein said guide means are configured such that said guide means guidably receive the guide members of said battery holder when said battery holder is inserted at a proper orientation and said guide means block the guide members of said battery holder when said battery holder is inserted at an improper orientation.

2. A device for fitting a button-shaped battery in a casing in accordance with claim 1, said guide means including two guides arranged on each of said two opposing walls of the four longitudinally extending walls, and said guided members including two bars, said two guides on one of said two opposing walls guidably receiving the two bars of the battery holder when said battery holder is inserted at a proper orientation, and said two guides on the other of said two opposing walls for rejecting the two bars of the battery holder when said battery holder is inserted at an improper orientation.

3. A device for fitting a button-shaped battery in a casing in accordance with claim 2, wherein a resilient pawl is provided on another side of the plate-shaped member, said pawl extending inwardly across the bore for maintaining the battery in the battery holder.

4. A device for fitting a button-shaped battery in a casing in accordance with claim 2, wherein the holder includes a grasping portion for grasping the battery holder when inserting the battery holder into the cavity and when removing the battery holder from the cavity, said grasping portion including a flat portion extending at a right angle to the plate-shaped portion of the battery holder.

5. A device for fitting a button-shaped battery in a casing in accordance with claim 2, said guides and said longitudinally extending opposing walls defining slits for receiving the two contact leaf springs at longitudinally extending edge portions of the contact leaf springs.

6. A device for fitting a button-shaped battery in a casing in accordance with claim 5, wherein said longitudinally extending edge portions of each contact leaf spring include a plurality of projections engageable with a portion of the guides defining one wall of the slit for holding the contact leaf springs firmly in the slits.

7. A device for fitting a button-shaped battery in a casing in accordance with claim 5, each of the two opposing walls including a groove for receivably engaging a projection extending from each contact leaf spring for holding the contact leaf springs firmly in the slits.

8. A device for fitting a button-shaped battery in a casing in accordance with claim 5, each contact leaf spring including a flat portion and a tongue portion being folded over onto the flat portion in a U-shaped configuration, said flat portion including the longitudinally extending edge portions for engagement with the slits and two end portions, and said longitudinally extending tongue portion extending continuously from one of the end portions of the flat portion to a free end.

9. A device for fitting a button-shaped battery in a casing in accordance with claim 8, wherein the tongue portion is configured such that a middle section of the tongue portion is spaced away from the flat portion of the contact leaf spring.

10. A device for fitting a button-shaped battery in a casing in accordance with claim 9, wherein the tongue portion extends from the spaced away middle section of the tongue portion toward the free end in a tapered manner, a portion of the free end being arranged adjacent to the flat portion of the contact leaf spring and a tip portion of the free end extending away from the flat portion.

11. A device for fitting a button-shaped battery in a casing in accordance with claim 9, wherein semispherical contacts arranged at the middle section of the tongue portion project outwardly from the contact leaf spring.

12. A device for fitting a button-shaped battery in a casing in accordance with claim 9, wherein said tongue portion includes two longitudinally extending strips, each strip including a free end and a middle section spaced away from the flat portion of the contact leaf spring, said middle section having a semispherical contact projecting outwardly from the leaf contact spring, said strip extending from the spaced away middle section toward the free end in a tapered manner, a portion of the free end arranged adjacent to the flat portion of the contact leaf spring and a tip portion of the free end extending away from the flat portion.

* * * * *